United States Patent [19]
Mengeringhausen et al.

[11] 3,895,789
[45] July 22, 1975

[54] ROTATABLE QUICK-ACTING AXIAL PRESSURE ABSORBING CHUCK FOR A CIRCULAR WELDING MACHINE

[75] Inventors: Max Mengeringhausen, Wurzburg; Hermann Quenzel, Lengfeld; Reinhold Gehrig, Retzstadt; Willi Spanheimer, Waldbuttelbrunn, all of Germany

[73] Assignee: Mero AG, Wurzburg, Germany

[22] Filed: Aug. 6, 1973

[21] Appl. No.: 385,678

[30] Foreign Application Priority Data
Aug. 18, 1972 Germany............................ 2240613

[52] U.S. Cl. ...................... 269/49; 269/50; 269/55; 279/1 R
[51] Int. Cl............................................. B23q 3/14
[58] Field of Search .......... 269/47, 48, 48.1, 49, 50, 269/51, 55; 279/1 R

[56] References Cited
UNITED STATES PATENTS

| | | | |
|---|---|---|---|
| 1,864,903 | 6/1932 | Gora | 269/50 |
| 2,408,560 | 10/1946 | Keehn | 269/47 |
| 3,758,098 | 9/1973 | Vrilakas | 269/55 |

*Primary Examiner*—Roy Lake
*Assistant Examiner*—Mark S. Bicks
*Attorney, Agent, or Firm*—Brady, O'Boyle & Gates

[57] ABSTRACT

A clamping stud has a central cylindrical bearing section connected for axial movement in the central bore of a bushing that is maintained in a bearing block. A reduced diameter stud portion on one end of the clamping stud has a radially extensible and retractable clamp mechanism thereon and extends through the central aperture of a screw cap threaded on one end of the bushing, the screw cap having an external transverse-axial contact face. The opposite end of the clamping stud has an eccentric apparatus connected thereto for moving the clamping stud axially relative to the bushing and screw cap, whereby the reduced diameter stud portion can extend through the central bore of an end member of a rod element or the like and after the clamp mechanism is radially extended to engage the interior of the end member the eccentric apparatus urges the clamping stud inwardly of the bushing to firmly retain the end member against the transverse-axial contact face of the screw cap.

4 Claims, 9 Drawing Figures

ROTATABLE QUICK-ACTING AXIAL PRESSURE ABSORBING CHUCK FOR A CIRCULAR WELDING MACHINE

The invention disclosed in this application is an improvement over the apparatus shown and described in copending application Ser. No. 279,051, filed Aug. 9, 1972 now U.S. Pat. No. 3,783,232 dated Jan. 1, 1974.

This invention relates to a rotatable, axial-pressure-absorbing quick-acting chucking device for a circular welding machine, especially for the production of rod elements having conical end members of varying sizes with a central bore, this device having a clamping stud which extends through the bore of a conical end member and holds the latter in contact with a transverse-axial contact surface.

Such rod elements, composed of a tubular section with conical end members welded thereto, are required in large numbers and varying dimensions for the construction of a large variety of buildings by the space framework construction method. Necessarily, the longitudinal dimensions of these rod elements must meet extremely high requirements, for example in order to avoid jamming during assembly or other troublesome effects. Taking the above demands into account, it has been conventional to manufacture the rod elements in two operating steps with interposed controls. In the first working step, the tubular section and the two conical end members are tacked together in a gauge wherein the conical end members are pressed against transverse-axial gauge limit surfaces by means of clamping studs. The clamping studs are passed, for this purpose, through the central bores of the conical end members and tightened by means of wing nuts. After the tacking step, the clamping studs are removed through suitable mounting holes in the tubular section and reused for the subsequent tacking operation. In the following second working step, the two circumferential welding seams are then produced in the zone of the conical end members, during which process the rod element revolves on corresponding roller blocks. This procedure, requiring a reclamping and repeated dimensional controls, is, however, not suitable for an economical mass production of different rod elements.

DOS [German unexamined laid-open application] No. 1,958,392 already discloses a labor-saving process for the manufacture of rod elements for the above purposes, wherein the two necessary annular welds are executed in the zone of the conical end members in one operation without relocation of the workpiece, while these end members are simultaneously held so that they cannot be displaced axially and the exact dimension of the finished rod elements is maintained. However, this disclosure does not contain any suggestion of the specific construction of the necessary rotatable and axial-pressure-absorbing clamping devices for conical end members of varying sizes.

Therefore, this invention is based on the problem of providing a rotatable, axial-pressure-absorbing quick-acting chuck of the type described in the foregoing, which can be readily and quickly converted for the reception of different conical end members and retains the latter in the clamped condition without any axial displacement at the dimension of the finished rod length, simultaneously making it possible to rotate the end members together for executing the necessary circumferential weld seams. At the same time, the chuck is to be structurally uncomplicated and easily operable, in order to reduce the time for the insertion and release of the workpieces to a minimum.

In order to solve the above problem, the invention starts with a rotatable, axial-pressure-absorbing quick-acting chuck of the type described hereinabove which is characterized, in accordance with the invention, by a clamping bush rotatably movably but axially fixedly supported in a bearing block, into which can be inserted axially displaceably and exchangeably clamping studs of different diameters with a bearing section of uniform cross section; by a radially effective clamp for a conical end member at one end of the clamping stud which can be operated by means of a clamping pin guided in an axial bore of the clamping stud; and by an eccentric displacement means for the clamping stud attachable to the other end of each clamping stud, by means of which a conical end member, when the radial clamping device has been actuated, can be retained against the transverse-axial contact surface formed by the external end face of a cap screw threadedly connected to the clamping bush, the clamping stud extending through the axial bore of this cap screw.

In correspondence with the numerous different conical end members with varying bores, it is merely necessary to keep clamping studs in stock which have varying diameters, which are easily exchangeable; it is only necessary to remove the eccentric displacing means and the cap screw, so that the clamping stud can be pulled out of the clamping bush. Thus, the basic construction, including the eccentric displacement means, can be advantageously employed for a great variety of clamping studs. The operation of the radial clamp for a conical end member is extremely simple, due to the clamping pin guided in the axial bore of the clamping stud, and as soon as the clamp has been placed into the operating position, one manipulation causes the eccentric displacement device to press the conical end member against the contact surface. The thus-clamped conical end member is then axially fixedly mounted on the clamping stud and can simultaneously be rotated in order to produce the required circumferential weld seam. The screw cap can be secured in the set position by conventional means. In order to release a conical end member from the chuck, it is merely necessary to unlock the radial clamp via the clamping pin and to retract the clamping stud axially. The time for attachment and release is thereby advantageously reduced to a minimum.

A suitable further embodiment of the invention resides in that the radially effective clamp is made of several gripping balls provided in the clamping stud in radial bores disposed in a common plane, and that the clamping pin has a section of reduced diameter, making it possible for the gripping balls to be retracted radially within the periphery of the clamping stud, and an adjoining conical section, by means of which the gripping balls can be adjusted radially outwardly into their operating position.

A further embodiment of the invention is characterized in that the eccentric displacement device has a bearing sleeve displaceably attached to the bearing section of the clamping stud, and that two mutually opposed arms are mounted to the bearing sleeve for the support of two eccentric disks respectively laterally in relation to the clamping stud, which disks cooperate with the external end face of the bearing sleeve, and the bearing pins of which can be connected with the other end of the clamping stud and are guided in slotted holes in the two arms.

Advantageously, two such chucks are equiaxially arranged in opposition to each other on the machine bed, one chuck being disposed to be fixed in the axial direction and the other being axially displaceable. While the clamping bush of the axially fixed chuck is coupled with a rotary drive, the axially movable chuck is used to adjust the respective length of the rod.

The invention will be explained in greater detail below with reference to the embodiment shown in the drawing, to wit:

Figure 2:
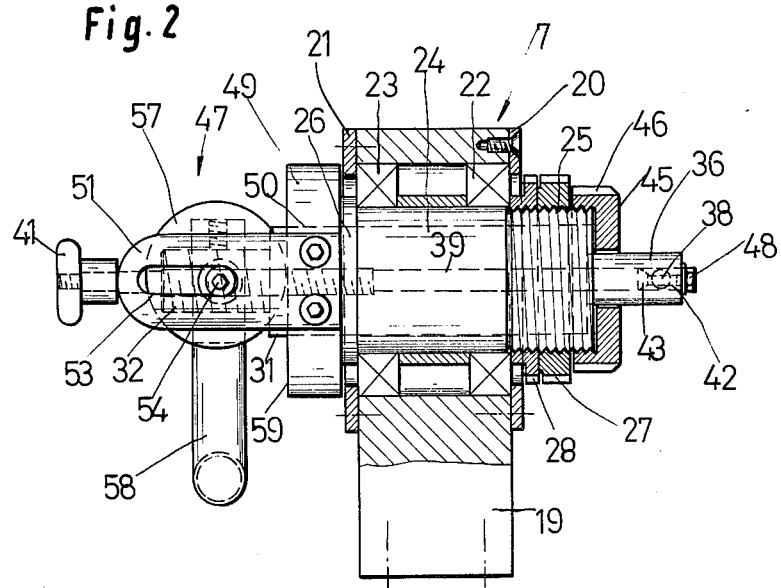
FIG. 2 is an enlarged sectional view of the longitudinally adjustable chuck disposed on the left-hand side in FIG. 1.
Figure 3:
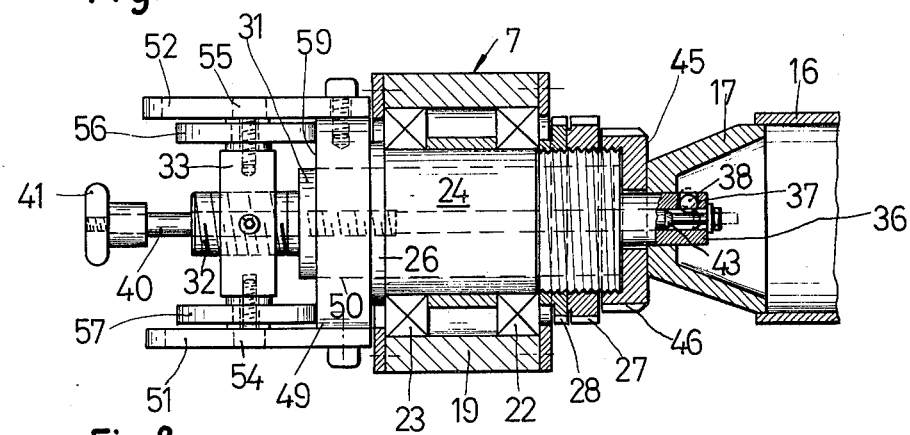
FIG. 3 is a top view of the chuck shown in FIG. 2.
Figure 8:
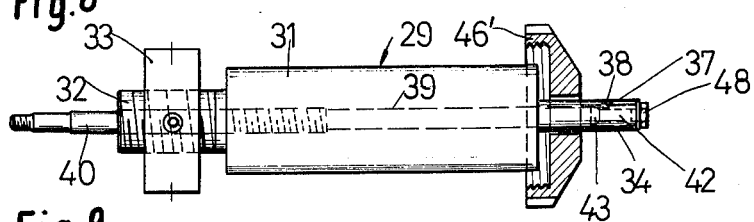
Figure 9:
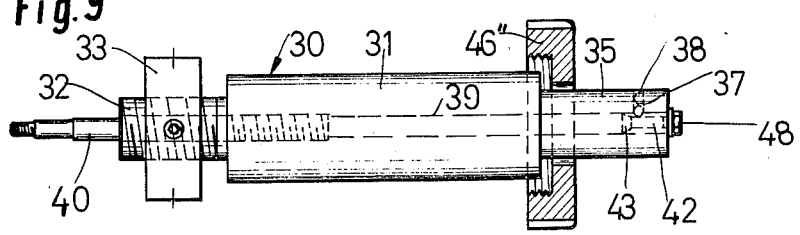
Figure 4:
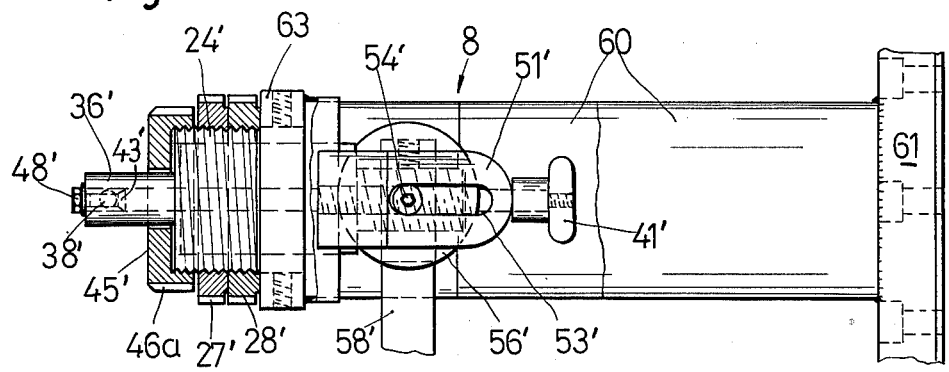
FIG. 4 is a top plan view of the axially fixed, motor-driven chuck shown on the right-hand side in FIG. 1, on an enlarged scale and partially broken away.
Figure 5:
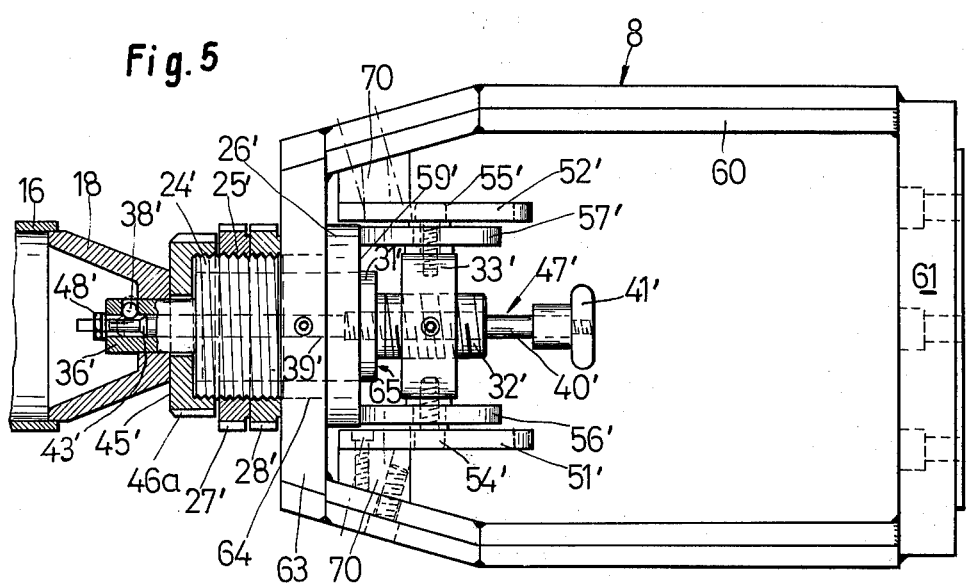
FIG. 5 is a side elevation view of the chuck shown in FIG. 4.
Figure 6:
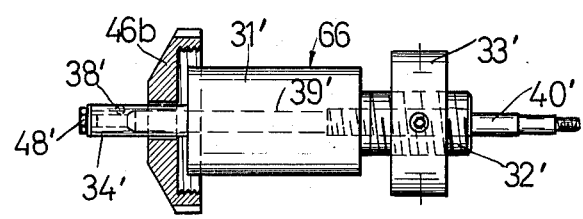
Figure 7:
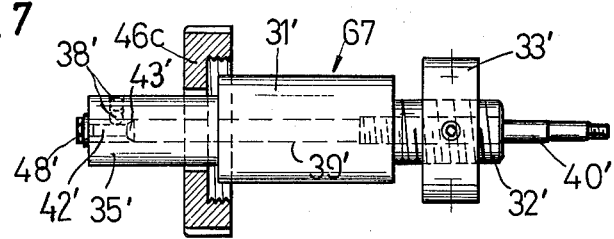

FIGS. 6 and 7 are elevation views partly in section showing two different clamping studs with associated cap screw, which can be inserted in the chuck shown in FIGS. 4 and 5; and FIGS. 8 and 9, located with FIGS. 2 and 3, are elevation views partly in section, showing two further different clamping studs for use in the chuck illustrated in FIGS. 2 and 3.

Figure 1:
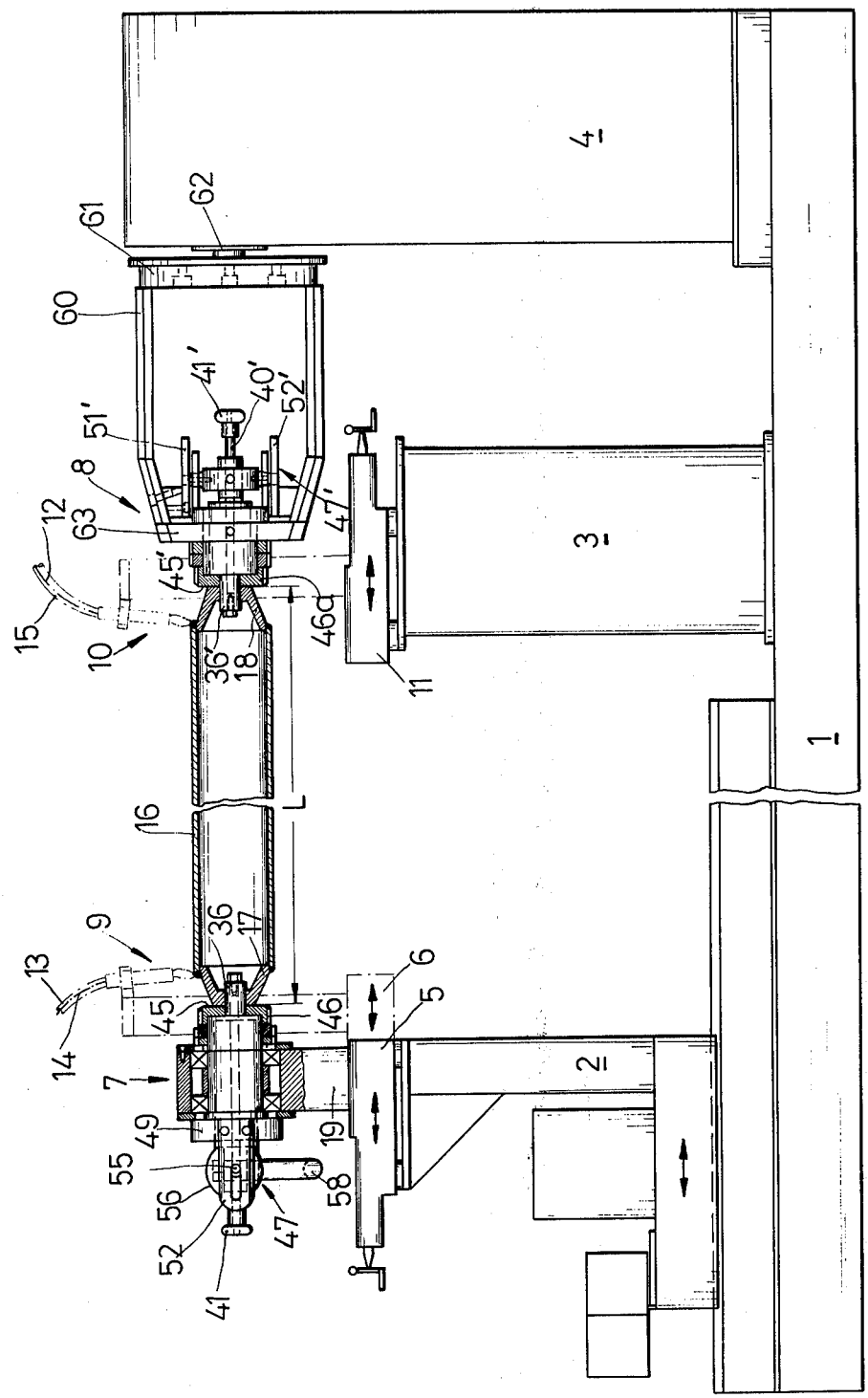
FIG. 1 is a lateral view of a circumferential welding machine with two opposed rotatable, axial-pressure-absorbing quick-acting chucks according to this invention, wherein conical end members are clamped, which members carry a tubular section.

The circumferential welding machine shown in FIG. 1 for the production of rod elements having conical end members has a base frame 1 on which a column 2 is arranged to be adjustable in the longitudinal direction of the machine. The column 2 can be displaced by means of a motor via a reduction gearing. Furthermore, two additional columns 3 and 4 are fixedly disposed on the base frame 1. The machine column 2 carries two longitudinal slide rests 5 and 6; a rotatable, axial-pressure-absorbing quick-acting chuck 7 being supported on the longitudinal slide rest 5. A similar quick-acting chuck 8, disposed equiaxially with respect to the chuck 7, is carried by the column 4. The chuck 8 is driven by a motor, but is fixedly arranged in the longitudinal direction of the machine.

The longitudinal slide rest 6, as well as a further longitudinal slide rest 11 supported on the machine column 3, serve for holding the protective-gas welding device 9 and 10 having a conventional automatic welding rod feed. The welding rods 12 and 13 are unreeled from rotatable rollers, not shown. Numerals 14 and 15 denote the combined welding current lines and feed conduits for the protective gas. The welding devices 9 and 10 serve for the simultaneous production of two circumferential welds between the ends of the tubular section 16 and the conical end members 17 and 18, which parts form, after the welding step, a rod element for a space framework. A centering means, not shown, effects an automatic center adjustment of the tubular section 16 on the conical end members 17, 18 prior to the beginning of the circumferential welding operations.

The quick-acting chuck 7 (see also FIGS. 2 and 3) has a bearing block 19 attached to the longitudinal slide rest 5; by means of lateral annular cover plates 20, 21 two ball bearings 22, 23 are installed in this bearing block. The ball bearings 22, 23 serve for mounting a clamping bush 24 so that it is rotatably movable; this clamping bush has a thread 25 at its end extending from the bearing block and a flange 26 at its opposite end. With the aid of two slotted nuts 27 and 28 mounted on the thread 25 and by means of the flange 26, the clamping bush 24 is axially fixed in the bearing block 19.

Clamping studs for the reception of different sizes of conical members can be inserted in the clamping bush 24. Two such clamping studs 29, 30 are illustrated as an example in FIGS. 8 and 9. These clamping studs all contain a bearing section 31 adapted to the inner diameter of the clamping bush 24, as well as a reduced section 32 to which a transverse-axial connecting piece 33 is threadedly attached. On the opposite end of each clamping stud, truing pins 34, 35, 36 are provided, the diameter of which corresponds in each case to the diameter of the central bore of the conical end members of different sizes. Furthermore, respectively three equidistantly arranged radial bores 37 are provided in the truing pins 34–36, gripping balls 38 being movably seated in these bores. In order to actuate the gripping balls 38, a clamping pin 40 is guided in an axial bore 39 of each clamping stud; this pin carries an operating handle 41 at one end and has a section 42 of a reduced diameter at the other end, making it possible to radially retract the gripping balls 38 within the periphery of the respective truing pin 34, 35 or 36, while an adjoining conical section 43, upon a corresponding displacement of the clamping pin, presses the gripping balls 38 radially outwardly somewhat outside of the periphery of the respective truing pin. If the gripping balls 38 are in this position, indicated by dot-dash lines in FIG. 3, an end member 17 which has, for example, been placed on the truing pin 36, is thereby pressed against a boundary surface 45 of a screw cap 46 threaded to the thread 25 of the clamping bush, by moving, according to FIGS. 2 and 3, the entire clamping stud toward the left by means of an eccentric displacement means 47.

The bores of the screw caps 46, 46' and 46'' are correspondingly adapted to the diameters of the truing pins 36, 34, and 35. Thus, the screw caps form a component of the exchangeable clamping stud. In case of larger truing pin diameters, two or more gripping balls 38 are insertable in each bore 37, as indicated in FIG. 9. A nut 48 at the outer end of the clamping pin 40 limits the axial movement of the clamping pin 40 toward the left (in accordance with FIGS. 2 and 3) and/or secures the clamping pin from being pulled out.

The eccentric displacement means 47 for the clamping studs 29, 30, etc. comprises a bearing sleeve 49 having a central bore 50, the diameter of which is adapted to that of the sections 31 of the clamping studs, so that the bearing sleeve can be placed on the sections 31 of the various clamping studs. Two arms 51, 52 are threadedly connected in opposition to each other to this bearing sleeve 49; these arms contain mutually aligned slotted holes 53. Two bearing pins 54, 55 are guided in the slotted holes 53, these pins being removably attached to the connection piece 33. Furthermore, eccentric disks 56, 57 are rotatably mounted on these bearing pins. The eccentric disks 56, 57 can be rotated by means of a handle 58, cooperating during this step with the outer end face 59 of the bearing sleeve 49.

When—as mentioned above—the conical end member 17 has been placed onto the truing pin 36, and the gripping balls 38 have been brought into their operating position by actuating the clamping pin 40, the handle 58 is pivoted so that the clamping stud is moved toward the left (FIGS. 2 and 3), during which procedure the conical end member 17 is fixedly pressed against the limiting surface 45 of the screw cap 46. By camping the opposed end member 18 in a similar manner and pushing the tubular section 16 onto the conical end members and centering this section thereon, the two circumferential welding operations can be effected.

The attachment and release of a conical end member can be accomplished very quickly, which is also true for converting the chuck for the reception of differently large conical end members, since it is merely necessary for this purpose to loosen the bearing pins 54, 55 and to remove the screw cap 46, so that the clamping stud in its entirety can be pulled out of the bearing sleeve and the device 7 and 8, respectively and can be exchanged for another clamping stud.

The quick-acting chuck 8 corresponds essentially to the above-described quick-acting chuck 7; however, in this case, the bearing block is replaced by a substantially U-shaped bracket 60 welded to the flange 61 which, in turn, is fixedly joined to a drive shaft 62 of a motor, not shown. The start of the rotating motion of the shaft 62 is conventionally synchronized with the beginning of the two circumferential welding operations. A central bore 64 is provided in the crosspiece 63 of the bracket 60, wherein a clamping bush 24' is attached by means of two screws. The clamping bush 24' likewise comprises a flange 26' and an external thread 25' for receiving the two slotted nuts 27', 28' and the cap screw 46a. Clamping studs 65, 66, 67, etc., with different truing pins 36', 34', 35', etc., can be inserted in the clamping bush 24', all of these truing pins, however, having a bearing section 31', the outer diameter of which corresponds to the inner diameter of the clamping bush 24'. It is to be noted that the lengths of the two clamping bushes 24 and 24' can also be identical, in a deviation from the illustrated embodiment, so that the clamping studs for both chucks can also be provided with equally long bearing sections 31 and 31', respectively, and can be substituted for each other.

Clamping pins 40' are displaceably inserted in the bores 39' of the clamping studs 65, 66, 67, etc., which serve for operating the gripping balls 38'. The connecting piece 33' threadedly connected to the section 32' of each clamping stud receives at its front ends bearing pins 54', 55' for eccentric disks 56', 57', wherein the bearing pins are movably supported in slotted holes 53' of arms 51', 52' which, in contrast to the chuck of FIGS. 2 and 3, are fixedly screwed to the U-shaped bracket 60 via intermediate members 70. The eccentric gripping means 47' is likewise operated by a handle 58', the eccentric disks 56', 57' cooperating with the free end face 59' of the flange 26'. The clamping of the conical end member 18 takes place in the same manner as in the chuck 7, which also holds true for the exchanging of the clamping studs 65, 66, 67, etc., for one another; however, upon a rotation of the bracket 60 by the drive shaft 62, the clamping stud 65 and thus the conical end member 18 are rotated, the latter in turn initiating the rotation of the tubular section 16 and the conical end member 17, as soon as the welding step has commenced.

By means of the longitudinal slide rest 5, the spacing L between the contact surfaces 45 and 45', respectively, of the cap screws 46, 46a is fixed accurately to the length of the finished rod element. Subsequently, the conical end members 17, 18 are gripped in the manner explained above with the aid of the gripping balls 38 and 38' and the eccentric displacement means 47, 47'. Thereupon, the tubular section 16 is pushed onto the end members 17, 18 and centered, and after the centering and tacking together of the components 16, 17, and 18, the two circumferential weldings are simultaneously effected in the zone of the overlapping places between the end members 17, 18 and the tubular section 16. After termination of the welding step, both eccentric displacement devices 47, 47' are simultaneously released via the handles 58, 58', the clamping pins 40 and 40' are retracted, and thereafter the entire clamping studs are pulled back to such an extent that the finished rod element falls out of the circumferential welding machine.

The slotted holes 53 and 53' are dimensioned so that the clamping studs can be pulled back so that their inner ends are in alignment with the boundary surfaces 45, 45' and a complete release of the finished rod element is ensured.

The clamping pins 40 as shown in FIGS. 2, 3, 8 and 9 are threadably connected in the axial bore 39 of each clamping stud 29, 30 so that upon rotation of operating handle 41 in one direction the threaded connection causes pin 40 to move from left to right bringing conical pin section 43 into contact with gripping balls 38 and moving the balls outwardly in their bores 37 so they protrude beyond the outer surface of the truing pins 34, 35 or 36. When handle 41 is rotated in the opposite direction conical pin section 43 moves from right to left due to the threaded connection and moves out from under the balls 38 allowing them to retract into the bores 37 beneath the outer surface of the truing pins 34, 35 or 36 until the balls come into contact with the reduced diameter pin section 42.

In a similar manner clamping pins 40' as shown in FIGS. 4, 5, 6 and 7 are threadably connected in the axial bore 39' of each clamping stud 65, 66, 67 for axial movement therein. Upon rotation of operating handle 41' in one direction the threaded connection causes pin 40' to move from right to left, bringing conical pin section 43' into contact with gripping balls 38' and moving them outwardly in their bores so they protrude beyond the outer surface of the truing pins 34', 35' or 36'. When handle 41 is rotated in the opposite direction the conical pin section 43' moves from left to right due to the threaded connection and moves out from under the balls 38' allowing them to retract into the bores beneath the outer surface of the truing pins 34', 35' or 36' until the balls come into contact with the reduced diameter pin section 42'.

What we claim is:

1. A rotatable axial pressure absorbing quick-acting chuck for a circumferential welding machine for producing rod elements having an end member with a central bore comprising a bearing block, a clamping bush with a central bore mounted for rotation in said bearing block and fixed against axial movement relative thereto, a clamping stud having a cylindrical bearing section connected for axial movement in the central bore of said clamping bush, a screw cap having a central aperture threadably connected to one end of said clamping bush, said screw cap having an external end face forming a transverse-axial contact surface for an end member, a reduced diameter stud portion on one of said clamping stud extending through the central aperture of said screw cap and adapted to extend through the central bore of an end member, radially extensible and retractable clamp means connected on said reduced diameter stud portion and adapted to engage the interior of an end member when extended, and eccentric displacement means connected to the opposite end of said clamping stud to move said clamping stud axially and adapted to retain an end member placed on said reduced diameter stud against said transverse-axial contact surface when said clamp means is radially extended, removable bolt means connecting said eccentric displacement means to said clamping stud for releasably connecting said eccentric displacement means to said clamping stud; the central bore of said clamping bush selectively receiving one of a plurality of interchangeable clamping studs, each stud having a cylindrical bearing section of the same diameter for connection in the central bore of said clamping bush, and each clamping stud having a reduced diameter stud portion of a different size for extending through and engaging a respective end member from a plurality of end members of varying sizes having central bores of different sizes, whereby chucks of different sizes corresponding to the sizes of the respective end members to be welded to the rod element may be rapidly interchanged on said welding machine.

2. A quick-acting chuck as set forth in claim 1 including a rotary drive means, said bearing block comprising a U-shaped bracket connecting said clamping bush and said clamping stud to said rotary drive means for rotation thereby.

3. A rotatable axial pressure absorbing quick-acting chuck for a circumferential welding machine for producing rod elements having an end member with a central bore, comprising a bearing block, a clamping bush with a central bore mounted for rotation in said bearing block and fixed against axial movement relative thereto, clamping stud means having a cylindrical bearing section connected for axial movement in the central bore of said clamping bush, a screw cap having a central aperture threadably connected to one end of said clamping bush, said screw cap having an external end face forming a transverse-axial contact surface for an end member, a reduced diameter stud portion on one end of said clamping stud means extending through the central aperture of said screw cap and adapted to extend through the central bore of an end member, radially extensible and retractable clamp means connected on said reduced diameter stud portion and adapted to engage the interior of an end member when extended, and eccentric displacement means releasably connected to the opposite end of said clamping stud means to move said clamping stud axially and adapted to retain an end member placed on said reduced diameter stud against said transverse-axial contact surface when said clamp means is radially extended; said eccentric displacement means comprising a bearing sleeve having an outer end face axially displaceably connected to said cylindrical bearing section of said clamping stud means, a pair of mutually opposed arms having guide apertures therein connected to said bearing sleeve and disposed on laterally opposite sides of said clamping stud means, a pair of eccentric discs having edges positioned to engage the outer end face of said bearing sleeve, and a pair of bearing pins connected to said opposite end of said clamping stud means and each oppositely extending through one of said eccentric discs and into guiding engagement with the guide aperture in one of said opposed arms.

4. A rotatable axial pressure absorbing quick-acting chuck for a circumferential welding machine for producing rod elements having an end member with a central bore, comprising a bearing block, a clamping bush having an outer end face and a central bore mounted for rotation in said bearing block and fixed against axial movement relative thereto, a clamping stud means having a cylindrical bearing section connected for axial movement in the central bore of said clamping bush, a screw cap having a central aperture threadably connected to one end of said clamping bush, said screw cap having an external end face forming a transverse-axial contact surface for an end member, a reduced diameter stud portion on one end of said clamping stud means extending through the central aperture of said screw cap and adapted to extend through the central bore of an end member, radially extensible and retractable clamp means connected on said reduced diameter stud portion and adapted to engage the interior of an end member when extended, and eccentric displacement means releasably connected to the opposite end of said clamping stud means to move said clamping stud means axially and adapted to retain an end member placed on said reduced diameter stud against said transverse-axial contact surface when said clamp means is radially extended; said eccentric displacement means comprising a pair of mutually opposed arms having guide apertures therein connected to said bearing block and disposed on laterally opposite sides of said clamping stud means, a pair of eccentric discs having edges positioned to engage the outer end face of said clamping bush, and a pair of bearing pins connected to said opposite end of said clamping stud means and each oppositely extending through one of said eccentric discs and into guiding engagement with the guide aperture in one of said opposed arms.

* * * * *